US008484583B2

(12) United States Patent
Reasoner et al.

(10) Patent No.: US 8,484,583 B2
(45) Date of Patent: Jul. 9, 2013

(54) OPERATOR CONTROL PANEL HAVING A REPLACEABLE DEFAULT SCREEN

(75) Inventors: Kelly J. Reasoner, Fort Collins, CO (US); Curtis C. Ballard, Eaton, CO (US); Mike P. Fleischmann, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1714 days.

(21) Appl. No.: 11/259,215

(22) Filed: Oct. 26, 2005

(65) Prior Publication Data
US 2007/0093937 A1    Apr. 26, 2007

(51) Int. Cl.
*G06F 3/048*    (2006.01)
*G06F 3/033*    (2006.01)

(52) U.S. Cl.
USPC ............ 715/867; 715/765; 715/788; 715/810

(58) Field of Classification Search
USPC .......................... 715/762, 867, 765, 788, 810
See application file for complete search history.

(56) References Cited

U.S. PATENT DOCUMENTS

| 5,933,142 A * | 8/1999 | LaStrange et al. | 715/788 |
| 6,353,449 B1 * | 3/2002 | Gregg et al. | 715/762 |
| 6,661,437 B1 * | 12/2003 | Miller et al. | 715/810 |

* cited by examiner

*Primary Examiner* — Haoshian Shih

(57) ABSTRACT

Storage apparatus and related methods wherein an operator control panel that controls functions and displays information regarding the storage apparatus and its storage devices is configured to have or display a selectable thumbtack function. The operator control panel is configurable to show a number of operational screens for managing the storage apparatus, show a default screen after a period of inactivity at the operator control panel, receive a designation that an operational screen should replace the default screen, and if designated, show the designated operational screen instead of the default screen after a period of inactivity.

19 Claims, 5 Drawing Sheets

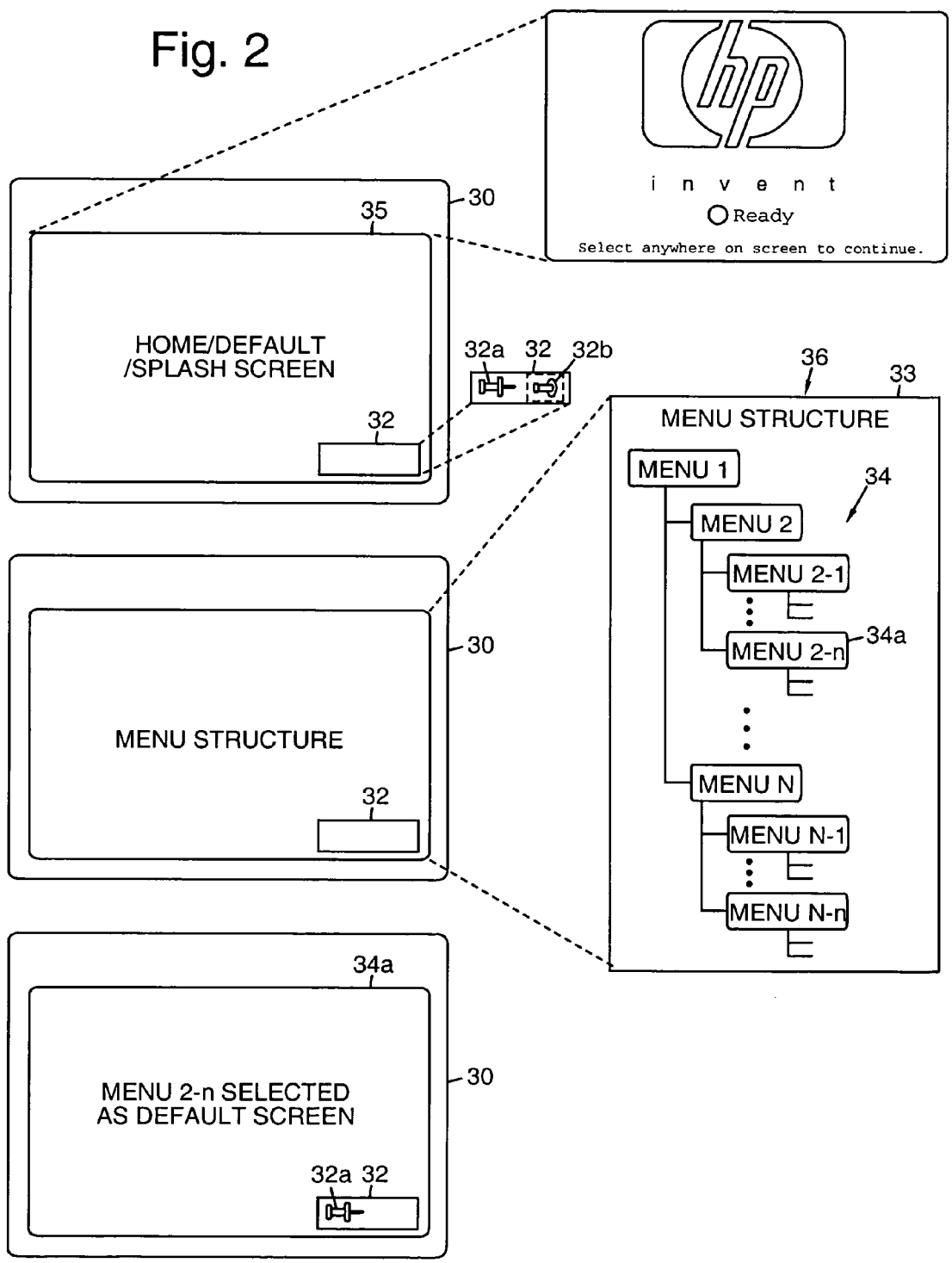

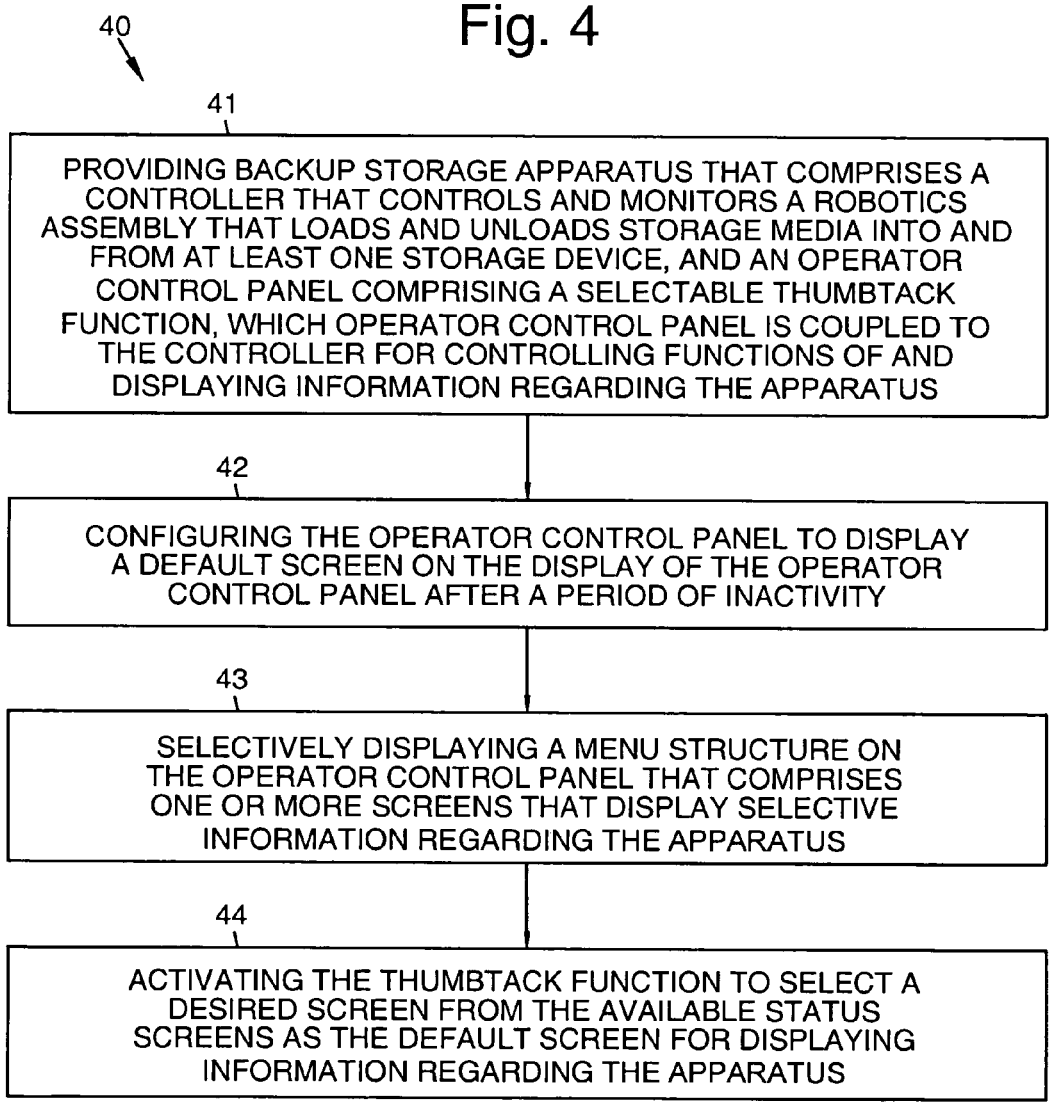

OPERATOR CONTROL PANEL HAVING A REPLACEABLE DEFAULT SCREEN

BACKGROUND

Businesses, governmental agencies, learning institutions, and other organizations typically operate computers that are interconnected by a network. Network users often store data on hard drives of network servers. Users also store data on their host computers.

Data stored on the network and/or host computers is typically backed-up periodically to create a copy of the data to prevent it from being lost due to mechanical failure or accidental deletion, for example, and/or to produce an archive of the data. Backup operations typically involve storing a copy of all or a portion of the data files on the network and/or host computers to a backup device such as a magnetic tape library having a plurality of magnetic tape drives.

Digital magnetic tape has long been used for data storage in computer systems. The low cost-per-bit stored, long-term retention capability, and portability of magnetic tape cartridges have made them invaluable for storing large quantities of data generated by businesses.

Tape cartridges are used by automated tape library devices. Tape libraries generally handle many tape cartridges to store very large amounts of data. The tape libraries hold the tape cartridges in predefined positions or media slots. When data is required from a particular tape cartridge, a host system communicates via a Small Computer System Interface (SCSI) bus or a Fibre Channel (FC) fabric, for example, with a controller of the tape library. The controller retrieves the particular tape cartridge from its media slot and places the tape cartridge in a tape drive. The host system may then read from or write to the tape cartridge via the tape drive. Also, the host system may query the controller to determine the number of tape cartridges, tape drives, and robotics mechanisms contained in the tape library to manage the tape library.

There are a number of manufacturers of tape libraries that back up and store large quantities of data to digital magnetic tape cartridges. For example, a StorageWorks brand of tape libraries are manufactured in various sizes and configurations. The number of tape cartridges that can be loaded into such tape libraries varies depending upon model, but may be on the order of 400-500 tapes, for example.

A typical tape library may have a control and display panel (or operator control panel) where local functions are controlled and where the health of the tape library may be displayed. The display typically presents information about components in the tape library that are built by the original library manufacturer. Value added components may also be installed in the tape library including software tools to aid in the configuration, installation, and management of the tape library.

The operator control panel may have a menu structure that is complicated and which has many paths. After a period of inactivity, the operator control panel may default to a home screen, such a splash screen with a logo. This may not be the screen that a user would like to display. It would be desirable to have a solution to this problem.

BRIEF DESCRIPTION OF THE DRAWINGS

The various features and advantages of disclosed embodiments may be more readily understood with reference to the following detailed description taken in conjunction with the accompanying drawings, wherein like reference numerals designate like structural elements, and in which:

FIG. 2 shows an exemplary generic operator control panel and thumbtack function;

FIG. 4 is a flow diagram that illustrates an exemplary method or algorithm for use with backup storage devices.

DETAILED DESCRIPTION

Backup storage apparatus 10 is disclosed and is discussed below in the context of a magnetic tape library 10. However, it is to be understood that the backup storage apparatus 10 is not limited only to magnetic tape libraries, but may be employed in the context of other storage devices and systems, including optical drives and hard disk drives, for example.

Figure 1:
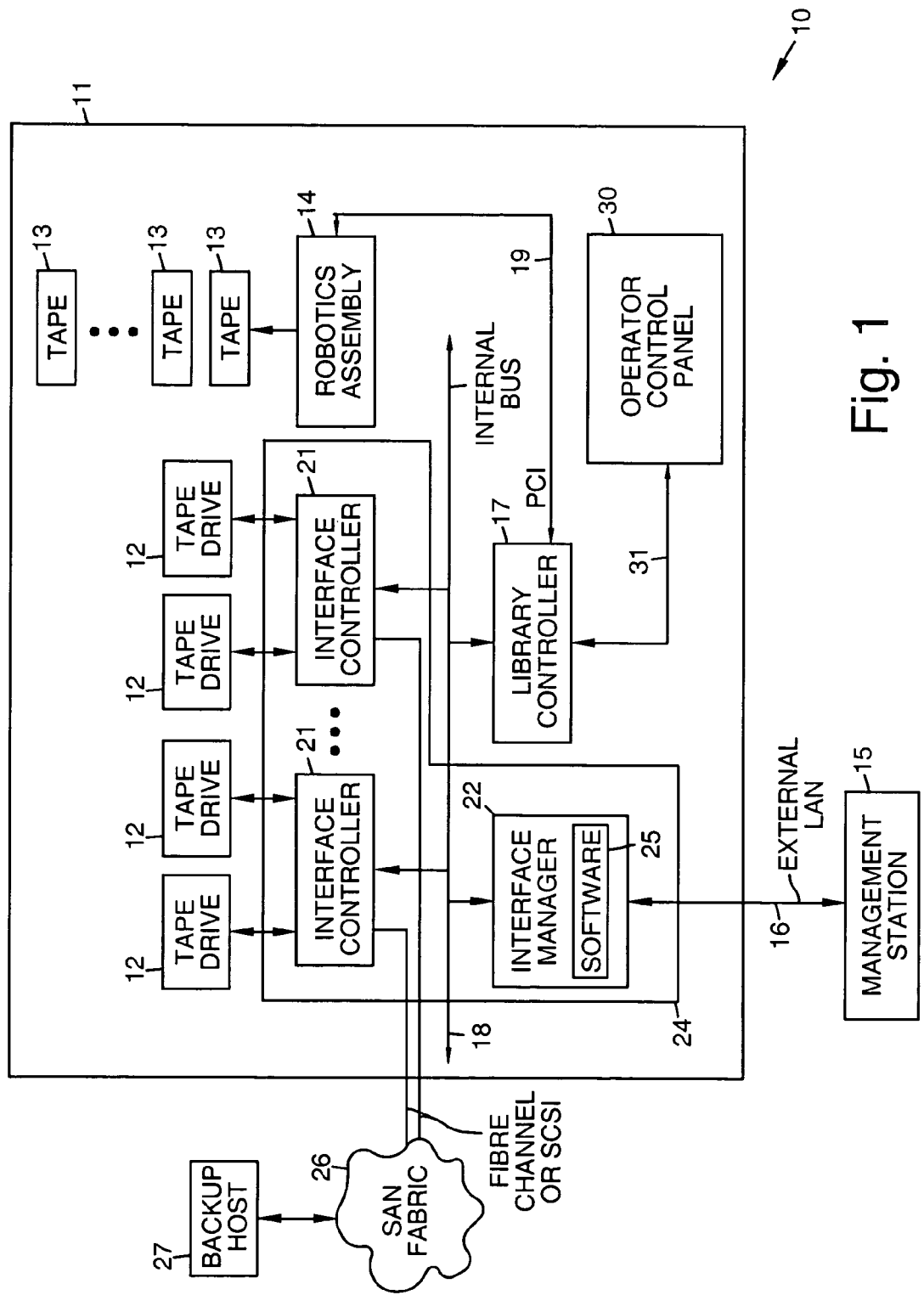
FIG. 1 is a block diagram that illustrates an exemplary tape library.

Referring to the drawing figures, FIG. 1 shows exemplary backup storage apparatus 10 comprising an exemplary tape library 10. The exemplary tape library 10 comprises a housing 11 in which a plurality of tape drives 12 (storage devices 12) are housed. A plurality of tape cartridges 13 (storage media 13) are loaded and stored in the housing 11 and which are manipulated by a robotics assembly 14 to load and unload them into a selected tape drive 12 to store data thereon or retrieve data therefrom. In other types of backup storage apparatus 10, the storage device 12 might comprise an optical disk reader used with optical disk media, or removable hard disk drives, for example.

An external management station 15 communicates with the tape library 10 by way of an external local area network (LAN) 16. The management station 15 is coupled by way of the external LAN 16 to a component 22 of the tape library 10 such as an interface manager 22 or management appliance 22. The interface manager 22 or management appliance 22 includes software tools 25 that aid in the configuration, installation, and management of the tape library 10, and specifically allow configuration and control of value added components 24 of the tape library 10. The interface manager 22 is coupled to an internal bus 18 comprising a communication link 18.

One or more interface controllers 21 may be coupled between selected tape drives 12 and the internal bus 18. The interface controllers 21 provide a communication path for the interface manager 22 to talk to the tape drives 12. The interface controllers 21 also provide a controlled data path between the tape drives 12 and a backup server 26. The backup server 27 communicates with the interface controllers 21 via a Fibre Channel fabric 26, shown in FIG. 1 as a storage area network (SAN) fabric 26, for example. A parallel data bus such as a Small Computer System Interface (SCSI) bus may be used in place of the Fibre Channel fabric 26, but this is not commonly used in current-generation computers.

The interface manager 22 or management appliance 22 and the interface controllers 21 comprise the value added components 24 of the tape library 10, i.e., components that may not be manufactured and installed by the original library manufacturer.

A library controller 17 is coupled by way of the internal bus 18 (communication link 18) to the one or more interface controllers 21 and to the interface manager 22 or management appliance 22. The library controller 17 is also coupled by the way of a private internal bus such as a PCI bus 19 to the robotics assembly 14.

The tape library 10 comprises an operator control panel and display system 30, referred to as an operator control panel 30, which is preferably disposed on a front panel of the tape library 10, for ease of use. The operator control panel 30 controls local functions and displays information regarding the tape library 10. The operator control panel 30 presents information about components in the tape library 10.

The operator control panel 30 comprises a graphical user interface (GUI) that displays library status information and allows a user to access the library menus. These menus allow a user to view or change the library settings, run demonstration programs, and run diagnostic tests, for example. Certain of these menus are illustrated in and are discussed with reference to FIGS. 3a-3f.

Referring now to FIG. 2, it shows an exemplary generic operator control panel 30 and thumbtack function 32. The exemplary operator control panel 30 and thumbtack function 32 are described herein with reference to their use in a tape library 10, such as was described with reference to FIG. 1. However, the operator control panel 30 and thumbtack function 32 may be used in other devices, such a personal digital assistant (PDA) device, or similar devices, for example.

Figure 2A:
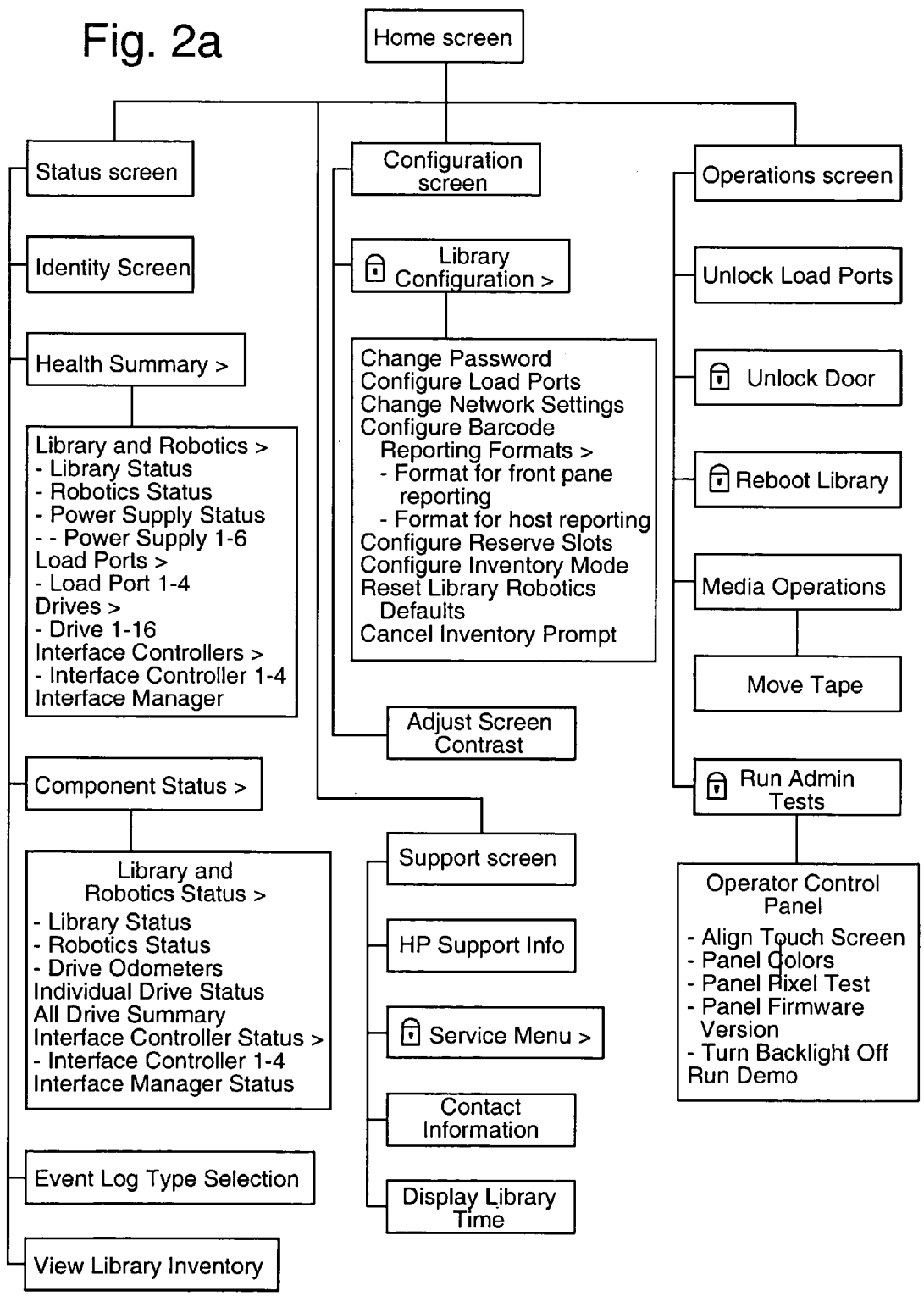
FIG. 2a shows an exemplary list of available functions of an operator control panel of an exemplary tape library.

The operator control panel 30 of the exemplary tape library 10, for example, typically has a menu structure 33 that is complicated and has many paths, such as is illustrated by multiple menus 34 shown in FIG. 2. FIG. 2a shows a detailed list of exemplary functions that may be provided by the menu structure 33 of the exemplary tape library 10. These exemplary functions may be displayed on the operator control panel 30. Some of the these functions may be "thumbtacked" using the thumbtack function 32.

Some of the display screens that may be presented on the operator control panel 30 may comprise operational screens that may show data from selected or multiple sources within the tape library 10. For example, a display screen may show data relating to sixteen (16) storage devices 12 (tape drives 12) employed in the tape library 10.

Individual display screens may be thumbtacked using the thumbtack function 32. Also, multiple display screens may be thumbtacked using the thumbtack function 32. In this case, only the last thumbtacked display screen is displayed as a default screen. In addition, multiple thumbtacked screens may be displayed in a cyclic manner, for example, which are cycled through and displayed at a predetermined rate.

Referring again to FIG. 2, after a period of inactivity, the operator control panel 30 defaults to a home screen 35, or default screen 35, such a splash screen 35, which is typically a static image that may comprise a logo or a blank screen 35 which is typically black. This home default screen/splash screen 35 is illustrated in the upper left display screen shown within the operator control panel 30 at the left side of FIG. 2. An exemplary home screen 35 is shown in the upper right portion of FIG. 2. This may not be the screen that a user would like to display. To remedy this, the operator control panel 30 is configured to have a thumbtack function 32 that is presented and which allows the user to select a desired status screen 34a (or operational screen 34a) from screen displays 36 that are available in the menu structure 33. FIG. 2 shows an exemplary thumbtack function 32 for use in the backup storage apparatus 10. Operational screens 34a are selected, such as by switching the state of a graphical thumbtack. If selected, the operational screens 34a are displayed during a period of inactivity instead of the default screen 35. If more than one operational screen 34a is selected, the display screen will rotate through each operational screen 34a much like a screen saver, for example.

An operational screen 34a is a view of the user interface that is selected for the purpose of being displayed during a period of inactivity so that status can quickly be ascertained without additional user interaction with the user interface. Often the operational screen 34a will show status of the system, but the operational screen 34a may also be a main menu or data entry view of a controlling application. The operational screen 34a may be a static view of the controlling application, but more often it will be a dynamic view of system status.

The thumbtack function 32 comprises a selectable identifier 32, such as an icon, button or switch, for example, that displays one of two identifiers 32a, 32b corresponding to "Thumbtack out" 32a (or Thumbtack On" 32a) and "Thumbtack in" 32b (or Thumbtack Off" 32b). These are shown at the right of the upper screen display shown in FIG. 2 and in FIG. 3.

When the "Thumbtack out" identifier 32b is displayed or no identifier 32 is displayed, one of the screen display 36 is eligible to be selected for display after a period of inactivity (timeout). When the thumbtack function 32 is activated and the "Thumbtack in" identifier 32a is displayed, the desired screen display 34a is locked in for display as the default screen 35 after the period of inactivity (timeout).

The exemplary thumbtack function 32 shown in FIG. 2 is in the form of an icon. However, it is to be understood that the thumbtack function 32 can be any type of icon, or selection element, or text, and is not limited to an icon of a thumbtack.

A user scrolls through the available screen displays 36 which are part of the menu structure 33, wherein individual screen displays 36 from the menu structure 33 are displayed in the center display screen shown in the operator control panel 30 at the left side of FIG. 2. An exemplary menu structure 33 with its available screen displays 36 is shown at the right side of FIG. 2. Again, individual screen displays 36 are navigated through to present them on the display screen, not the menu structure 33. The dashed lines projecting from the center display screen to the menu structure 33 indicates that the menu structure 33 is displayed in the center display screen.

Once the user identifies a particular screen display 36, such as screen display 34a, for example, in the menu structure 33 that he or she wants to use as the default screen 35, the thumbtack function 32 is activated to "lock in" the selected screen display 34a. Again, the thumbtack function 32 is essentially an on/off switch that when selected identifies the selected screen display 34a as the default screen 35. Using the thumbtack function 32, the default screen 35 may take the form of any of the available screen displays 36 in the menu structure 33.

Thus, if no screen display 36 available in the menu structure 33 is thumbtacked using the thumbtack function 32, the display screen of the operator control panel 30 presents the home screen/splash screen 35 with a logo, for example. If one of the screen displays 36 in the menu structure 33 is thumbtacked using the thumbtack function 32, this particular screen display 36, such as screen display 34a, for example, is presented on the display screen of the operator control panel 30.

The user can selectively have the default screen 35 become a selected status screen 34a which enables the user to see desired status information regarding devices of the tape library 10 without drilling down into the menu tree, so that the status of desired devices may be viewed. The thumbtack function 32 thus allows a selected status screen 34a to be designated as the default screen 35.

The selective nature of the thumbtack function 32 allows the user to change the screen that is displayed after a period of inactivity (timeout) which would normally display the logo splash screen to one that is most relevant to his or her needs. The status screen 34a that is displayed may easily be changed using the thumbtack function 32. The solution provided by the thumbtack function 32 also allows the default screen 35 to be easily reconfigured in order to view any desired status screen 34a relating to devices installed in the tape library 10.

Thus, it is easy to find an appropriate status screen 34a in the menu tree, which minimizes the complexity of navigating to it. Also, the user can see at a glance the changing status of devices during troubleshooting or test, for example, without having to continue to reenter and navigate the path to the desired status screen 34a.

Figure 3:
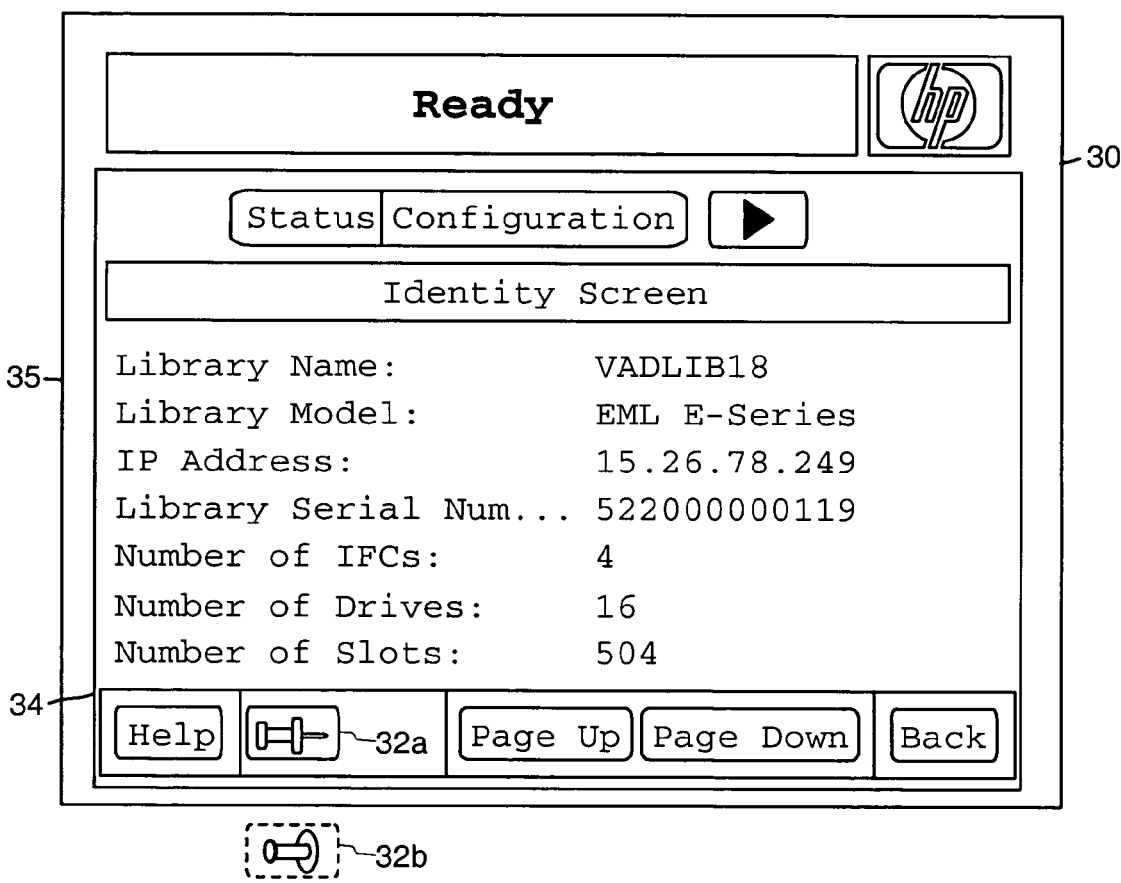
FIG. 3 shows an exemplary screen display that may be presented on a backup storage device.

FIG. 3 shows an exemplary screen display 34 that may be presented on a backup storage device 10, such as a tape library 10, or other device, for example, that that may be selected as the splash screen 35 using the exemplary thumbtack function 32.

The exemplary thumbtack function 32 may be activated to select any one of a number of screen displays 34 as the splash screen 35 that are arrived at by migrating through the menu structure or tree. The operator control panel 30 has a menu structure that has many paths, such as is illustrated by menus 36 shown in FIGS. 2 and 2a.

The exemplary screen display 34 shown in FIG. 3 may be arrived at by migrating through a number of screen displays 34 that present information relating to different aspects of the backup storage device 10, or tape library 10. Exemplary screen displays 34 may include Status, Configuration, Operation and Support screen displays 34, for example, two of which are shown in FIG. 3.

Clicking on an appropriate selectable identifier 32 (selector 32 or selectable menu item 32) representing the Status, Configuration, Operation and Support screen displays 34 takes the user to lower levels in the menu structure or tree relating to the particular information that is desired. The selectable identifier 32 may comprise an icon, selectable text, label, banner, or other selectable area of the display screen 35, for example.

Status and Configuration selectable identifiers 32 are shown near the top of the screen displays 34 shown in FIG. 3. Other screen displays 34, such as Library Status, Robotics Status, Drive Status, All Drive Summary, Interface Controller Status, Interface Manager Status, Operation and Support screen displays 34, for example, may be viewed by clicking on the right pointing triangular arrow to the right of the Status and Configuration selectable identifiers 32. Selecting one of the selectable identifiers 32 takes the user to a subsequent screen display 34 of the menu structure. Help and Back icons are presented on each of the screen display 34 that allow a user to access one or more help screens relating to what is displayed on the screen display 34, and to return to a previous screen display 34.

FIG. 3 illustrates an exemplary Identity screen display 34 that may be accessed through the Status menu. The Identity screen display 34 lists the library name, library model, IP address of the library, serial number, and so forth.

The Identity screen display 34 includes the thumbtack function 32 at the bottom of the screen. The thumbtack function 32 indicates that the Identity screen display 34 is thumbtacked, as indicated by the thumbtack icon 32a next to the Help button at the left of the screen display 34. If this screen display 34 were not thumbtacked, the icon 32b shown in the dashed box at the bottom of FIG. 3 would be displayed in place of the thumbtack icon 32a shown in the screen display 34.

The particular screen display 34 that may be thumbtacked are not limited to only the Identity screen display 34. Many other screen displays 34 may be thumbtacked and include Library Status, Robotics Status, Drive Status, All Drive Summary, Interface Controller Status, Interface Manager Status, Operation and Support screen displays 34, for example. Furthermore, a thumbtacked screen may contain more than a single display's worth of information. In this case, the display may be configured to cycle through each of the displays at some predetermined rate. Thus, multiple thumbtacked screens may be displayed in a cyclic fashion, and which are displayed at some predetermined rate.

It is to be understood that multiple screen displays 34 may be thumbtacked, and the default screen would cycle through the multiple screen displays 34 in a timed manner, say at one second intervals, for example.

FIG. 4 is a flow diagram that illustrates an exemplary method 40 or algorithm 40 for use in backup storage apparatus 10. The exemplary method 40 or algorithm 40 may be used with storage apparatus 10 such as magnetic tape libraries, optical drives and hard disk drives, for example, although it is described with reference to use with a tape library 10. The exemplary method 40 or algorithm 40 may also be used in other devices, such a personal digital assistant (PDA) device, or similar devices, for example. The exemplary method 40 or algorithm 40 comprises the following actions.

A backup storage apparatus 10 (storage apparatus 10) is provided 41, or implemented 41, that comprises a controller 17 that controls and monitors a robotics assembly 14 that loads and unloads storage media 13 into and from at least one storage device 12, and an operator control panel 30 comprising a selectable thumbtack function 32, which operator control panel 30 is coupled to the controller 17 for controlling functions of and displaying information regarding the backup storage apparatus 10.

The operator control panel 30 is configured to display 42 a default screen 35 on the display of the operator control panel 30 after a period of inactivity. The operator control panel 30 selectively displays 43 a menu structure 33 that comprises one or more screen displays 34 that display selective information regarding the backup storage apparatus 10. The thumbtack function 32 may be activated 44 to select a desired screen display 34a from the plurality of available screen displays 34 as the default screen for displaying information regarding the backup storage apparatus 10.

Thus, a backup storage apparatus and method or algorithm that implement a thumbtack function to allow a user to selectively display a desired status screen instead of a default splash screen have been disclosed. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. A storage apparatus comprising:
a housing containing storage devices; and
an operator control panel attached to the housing and including a display and configured to:
show a number of operational screens for managing the storage apparatus;
show a default screen after a period of inactivity at the operator control panel;
show a menu structure having elements representing corresponding ones of the operational screens, wherein the menu structure has plural levels of the elements, where a particular one of the elements at a lower level is accessed in response to selecting another one of the elements at a higher level, wherein the menu structure is navigatable by a user to allow selection of the elements, wherein each of the elements of the menu structure has a corresponding thumbtack function selectable by a user between at least two states, wherein a first of the two states is an indication that the corresponding operational screen is to be displayed instead of the default screen after the period of inactivity, and wherein a second of the two states is an indication that the corresponding operational screen is not to be displayed instead of the default screen after the period of inactivity;

receive a designation, responsive to user selection of the thumbtack function of at least a corresponding one of the elements in the menu structure, that at least a selected one of the operational screens is to replace the default screen for use as a home screen after the period of inactivity; and in response to the designation, show the selected operational screen instead of the default screen as the home screen after the period of inactivity.

2. The apparatus recited in claim 1 wherein each of the thumbtack functions comprises a switch.

3. The apparatus recited in claim 1 wherein each of the thumbtack functions comprises a button.

4. The apparatus recited in claim 1 wherein each of the thumbtack functions comprises an icon.

5. The apparatus recited in claim 1 wherein said designation indicates that a plurality of the operational screens is to replace the default screen, and said plurality of operational screens are displayed in cyclical fashion at a predetermined rate after said period of inactivity.

6. The apparatus recited in claim 1, wherein the menu structure is a menu tree.

7. The apparatus recited in claim 1, wherein the menu structure has plural paths to different ones of the elements.

8. A system comprising:
a housing containing a storage drive;
a robotics assembly to mount storage cartridges in the storage drive; and
an operator control panel attached to the housing and configured to:
show a number of operational screens for managing the storage apparatus;
show a default screen after a period of inactivity at the operator control panel;
show a menu structure having elements representing corresponding ones of the operational screens, wherein the menu structure has plural levels of the elements, where a particular one of the elements at a lower level is accessed in response to selecting another one of the elements at a higher level, wherein the menu structure is navigatable by a user to allow selection of the elements, wherein each of the elements of the menu structure has a corresponding thumbtack function selectable by a user between at least two states, wherein a first of the two states is an indication that the corresponding operational screen is to be displayed instead of the default screen after the period of inactivity, and wherein a second of the two states is an indication that the corresponding operational screen is not to be displayed instead of the default screen after the period of inactivity;
receive a designation, responsive to user selection of the thumbtack function of at least a corresponding one of the elements in the menu structure, that at least a selected one of the operational screens is to replace the default screen for use as a home screen after the period of inactivity; and
in response to the designation, show the selected operational screen instead of the default screen as the home screen after the period of inactivity.

9. The system recited in claim 8 wherein each of the thumbtack functions comprises a button.

10. The system recited in claim 8 wherein each of the thumbtack functions comprises a switch.

11. The system recited in claim 8 wherein each of the thumbtack functions comprises an icon.

12. The system recited in claim 8, wherein the menu structure is a menu tree.

13. An information screen selection method comprising:
providing a storage apparatus comprising a housing containing storage devices and an operator control panel attached to the housing and including a display;
displaying a number of operational screens at the operator control panel for managing the storage apparatus;
displaying a default screen after a period of inactivity at the operator control panel;
displaying a menu structure at the operator control panel, wherein the menu structure has elements representing corresponding ones of the operational screens, wherein the menu structure has plural levels of the elements, where a particular one of the elements at a lower level is accessed in response to selecting another one of the elements at a higher level, wherein the menu structure is navigatable by a user to allow selection of the elements, wherein each of the elements of the menu structure has a corresponding thumbtack function selectable by a user between at least two states, wherein a first of the two states is an indication that the corresponding operational screen is to be displayed instead of the default screen after the period of inactivity, and wherein a second of the two states is an indication that the corresponding operational screen is not to be displayed instead of the default screen after the period of inactivity;
receiving a designation, responsive to user selection of at least a corresponding one of the elements in the menu structure, that a selected one of the at least operational screens is to replace the default screen; and
in response to the designation, displaying the selected operational screen instead of the default screen after the period of inactivity.

14. The method of claim 13, wherein the designation is received in response to user selection of the thumbtack function of at least the corresponding one of the elements in the menu structure, and the designation specifies that the selected operational screen is to replace the default screen for use as a home screen after the period of inactivity.

15. The method recited in claim 14 wherein each of the thumbtack functions comprises a button.

16. The method recited in claim 14 wherein each of the thumbtack functions comprises a switch.

17. The method recited in claim 14 wherein each of the thumbtack functions comprises an icon.

18. The method recited in claim 14 wherein said designation indicates that a plurality of the operational screens is to replace the default screen, and said plurality of operational screens are displayed in cyclical fashion at a predetermined rate after said period of inactivity.

19. The method recited in claim 14, wherein the menu structure is a menu tree.

\* \* \* \* \*